(No Model.)
M. KRAKER.
FILTER.
No. 509,740. Patented Nov. 28, 1893.
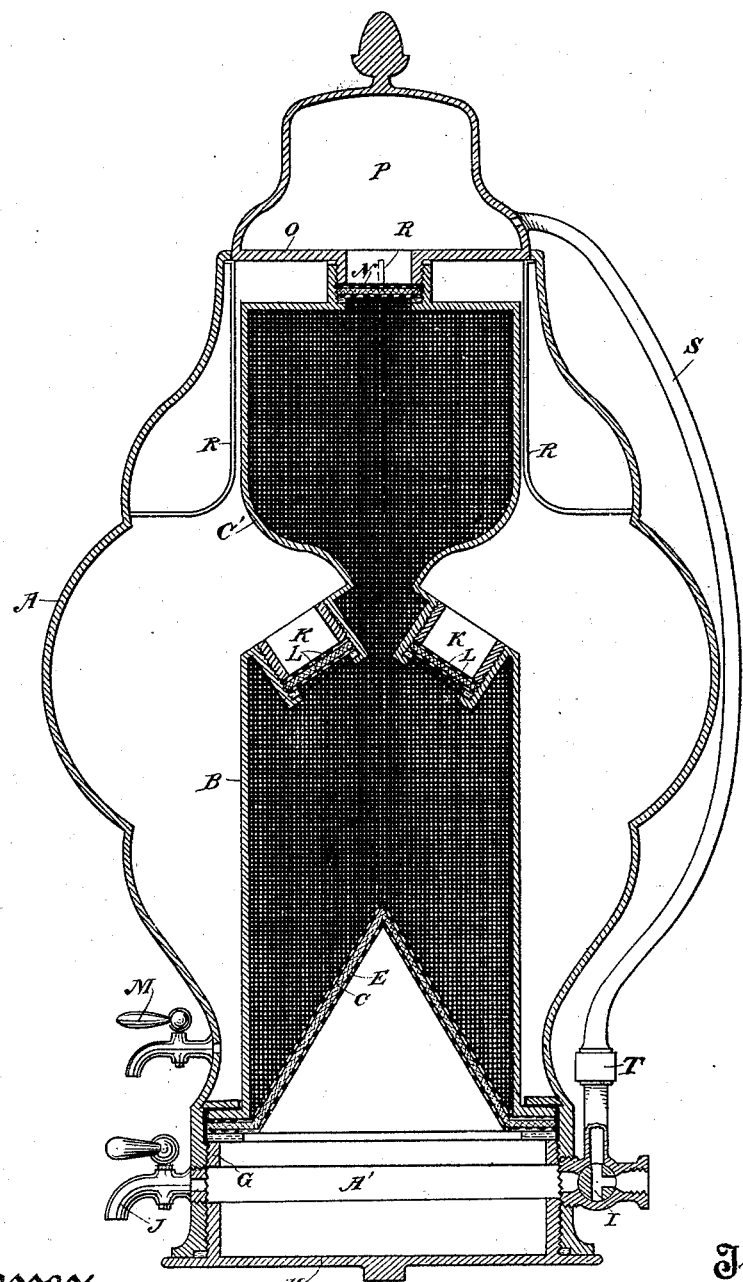
Witnesses,
Inventor
Michael Kraker
By Dewey & Co.
Attys

UNITED STATES PATENT OFFICE.

MICHAEL KRAKER, OF SAN FRANCISCO, CALIFORNIA, ASSIGNOR TO THE ACME FILTER COMPANY, OF SAME PLACE.

FILTER.

SPECIFICATION forming part of Letters Patent No. 509,740, dated November 28, 1893.

Application filed October 19, 1891. Renewed February 15, 1893. Serial No. 462,503. (No model.)

*To all whom it may concern:*

Be it known that I, MICHAEL KRAKER, of San Francisco, county of San Francisco, and State of California, have invented certain new and useful Improvements in Filters; and I do hereby declare that the following is a full, clear, and exact description of the same, reference being had to the accompanying drawing, which forms a part of this specification.

My invention relates to appliances for separating solid impurities and other undesirable substances from water and other liquids.

The objects and nature of my invention will be understood from the following description taken in connection with the accompanying drawing in which the figure is a central transverse vertical section of a filter embodying my invention.

In the said drawing B and C' designate two cylinders which are placed vertically the one above the other and which are connected together by a tubular neck, so that the interiors of the two cylinders communicate with each other and thus constitute practically a single continuous chamber in which is packed a mass of pulverized charcoal or other suitable filtering material. The lower end of the lower cylinder B is provided with a screen C and the upper end of the upper cylinder C' is provided with a screen N; the mass of filtering material being packed between said screens. Moreover, the upper end of the lower cylinder B is formed with a number of openings K in which are secured screens L, for a purpose to be presently explained. The cylinders B are located within a shell or casing A the interior of which constitutes a reservoir for filtered liquid; a discharge faucet M leads from this reservoir and through said faucet the filtered liquid may be drawn as desired.

The lower end of the shell A is closed by a base-plate H screwed into position, and to said lower end of the shell is connected a supply pipe having a two-way cock I. A discharge faucet J is connected to the lower end of the shell A, preferably at a point directly opposite from the two-way cock I, and also communicating (as does the supply pipe) with a space or compartment in the bottom of the filter. A branch pipe S leads upward from the two-way cock I and is connected at its upper end to a cap or dome P the interior of which forms a space above the screen N with which the branch pipe S communicates. The arrangement is such that by turning the two-way cock I in one direction the liquid will enter the lower end of the filter and flow upward through the lower screen C and cylinder B outward through the screens L and into the reservoir A. Also, by turning the two-way cock I in the opposite direction (or to a greater extent in the direction in which it was first turned) the water will be shut off from the lower part of the filter and will be diverted through the branch pipe S into the cap or dome P. From this cap or dome the water will flow downward through the upper cylinder C' and outward through the screen or screens L and into the reservoir A.

Usually the first described or upward course is adopted in the filter, because this enables the action of gravity to assist in separating the solids from the liquid, and when it is desired to clean the filter the faucet J is opened; the two-way cock I being set so as to admit liquid into the lower end of the filter. Thus the liquid is caused to rush immediately across the lower space A' of the filter and to flush all impurities therefrom, at the same time washing off the under surface of the screen C.

The screens C, L and N are preferably each formed of two foraminous outer layers, such as wire cloth or perforated metal, with an interposed layer of asbestus cloth or fiber. The bottom H is preferably screwed into the lower end of the filter, while the cap or dome P is screwed into a diaphragm O at the upper end of the shell A. Vertical rods R are preferably employed to guide the lower filtering receptacle to its position, when said cylinder is being inserted into the shell A; said rods extending vertically through the reservoir A. The lower screens E are shown as abutting at their margins upwardly against a shoulder upon the inner sides of the cylinder B; a binding ring G being screwed into the lower end of the cylinder B and pressing against the under sides of the margins of the screens. Similar shoulders and rings are used to confine the screens L in position in their openings K, while the screens N are confined by a screw-clamping ring against the lower margin of the opening in the diaphragm O. Suitable packings may be placed around the margins of all of the screens and also at the joints of the other connected parts of the filter, thereby preventing leakage at these parts. The lower screens C are preferably of conical form and are placed with their apices extending upwardly, as shown.

While the openings K are shown as formed in the top wall of the lower cylinder B and as facing or opening downwardly, yet it is obvious that the same result will be produced if the said openings are differently arranged, provided that they face in one direction only, or are placed at one side only, as distinguished from being placed both above and below the neck which connects the cylinders B and C. It is necessary that the screened openings K should open or face in one direction only, or, in other words, that said openings should be arranged so as not to permit the passage of water used in washing out the filtering material through one of said openings into the said chamber A, and then from said chamber through another opening again into the mass of filtering material, for the reason that if so arranged, impurities would be carried into the chamber A and would there remain. By facing the openings K in one direction, (preferably downward or in a direction away from the inlet through which water is forced in washing out the filter, as shown) the water forced through the filtering material passes around or past the screens L L, without passing or flowing through the same; the outlet of the chamber A being of course closed at the time of washing out the filter.

What I claim is—

1. A filter having end chambers separated from an intermediate space by screens and each provided with an inlet and one with an outlet, said intermediate space being filled by a continuous mass of filtering material, and a central screened outlet adapted for the outward passage only of water from said intermediate space, substantially as described.

2. A filter having end chambers separated from an intermediate space by screens and each provided with an inlet and one of them only with an outlet, said intermediate space containing a continuous mass of filtering material, and having central communication through a screen with a filtered-water chamber which is also provided with an outlet.

3. In a filter, an external shell or casing forming a filtered water chamber, an internal filter chamber composed of two compartments having open communication with each other and filled with filtering material, a bottom screen wall for said filter chamber of conical form projecting into the chamber, a top screen wall therefor, and one or more screened openings adjacent to the point of communication between the upper and lower compartments of the filter chamber and delivering into the filtered water chamber, liquid chambers above and below the filter chamber, a supply pipe leading into the lower of said liquid chambers and provided with a two-way valve, and a branch pipe leading from the valve casing to the upper of said liquid chambers, a valved outlet for the lower of said liquid chambers and a valved outlet from the filtered water chamber.

4. A filter consisting of an external shell or casing forming a filtered water chamber and provided with a valved outlet, an internal, removable filtering-chamber containing filtering material, screens at the top and bottom of the filtering-chamber, one or more screened openings leading from the central point of the filtering-chamber to the filtered water chamber, liquid chambers at the opposite ends of the filtering-chamber, supply pipes leading to said liquid chambers, retaining flanges and joints by which the filtering-chamber is secured between the top and bottom liquid chambers, a valve for diverting the supply to either of the end liquid chambers, and a valved outlet for one of said liquid chambers.

In witness whereof I have hereunto set my hand.

MICHAEL KRAKER. [L. S.]

Witnesses:
M. S. EISNER,
THOS. E. RYAN.